(12) United States Patent
Julian et al.

(10) Patent No.: US 7,796,552 B2
(45) Date of Patent: Sep. 14, 2010

(54) USING ASSIGNMENT MESSAGES FOR EFFICIENT SIGNALING OF HANDOFF

(75) Inventors: David Jonathan Julian, San Diego, CA (US); Avneesh Agrawal, San Diego, CA (US); Edward Harrison Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1005 days.

(21) Appl. No.: 11/418,932

(22) Filed: May 4, 2006

(65) Prior Publication Data
US 2006/0268783 A1     Nov. 30, 2006

Related U.S. Application Data

(60) Provisional application No. 60/678,363, filed on May 5, 2005.

(51) Int. Cl.
H04W 4/00 (2009.01)
(52) U.S. Cl. .......... 370/331; 370/332; 370/333; 370/334; 455/436; 455/437; 455/438; 455/439; 455/442; 709/234; 379/112.1; 379/221.03; 379/266.04
(58) Field of Classification Search ........... 370/331, 370/332, 333, 334; 455/436, 437, 438, 439, 455/442; 709/234; 379/112.1, 221.03, 266.04
See application file for complete search history.

(56) References Cited

U.S. PATENT DOCUMENTS

| 6,134,200 | A | 10/2000 | Timmermans | |
|---|---|---|---|---|
| 6,628,631 | B1 * | 9/2003 | Mazawa et al. | 370/331 |
| 6,633,554 | B1 * | 10/2003 | Dalal | 370/331 |
| 6,725,043 | B2 * | 4/2004 | Bonta et al. | 455/437 |
| 2002/0085517 | A1 * | 7/2002 | Lee et al. | 370/331 |
| 2003/0076796 | A1 * | 4/2003 | Kondo | 370/332 |
| 2003/0119511 | A1 * | 6/2003 | Shin | 455/439 |
| 2005/0073975 | A1 * | 4/2005 | Chen et al. | 370/331 |

FOREIGN PATENT DOCUMENTS

| RU | 2073913 | 2/1997 |
|---|---|---|
| WO | 9205556 | 5/1992 |
| WO | 9747154 | 12/1997 |

OTHER PUBLICATIONS

International Search Report dated Sep. 24, 2007 for PCT/US06/17417.
Written Opinion—PCT/US06/017417, International Search Authority—US, Sep. 24, 2007.

* cited by examiner

*Primary Examiner*—Rafael Pérez-Gutiérrez
*Assistant Examiner*—Nimesh Patel
(74) *Attorney, Agent, or Firm*—Darren M. Simon; Milan Patel

(57) ABSTRACT

Systems and methods are provided to facilitate efficient communications handoff for access terminals in a wireless network. In an aspect, a method to handoff communications in a wireless network is provided. The method includes decoding assignment messages from one or more sectors in an active set and performing an access terminal handoff based at least in part on the active set.

26 Claims, 10 Drawing Sheets

USING ASSIGNMENT MESSAGES FOR EFFICIENT SIGNALING OF HANDOFF

CROSS REFERENCE TO RELATED APPLICATION

This application claims the benefit of U.S. Provisional Patent Application Ser. No. 60/678,363 filed on May 5, 2005, entitled "Using Assignment Messages for Efficient Signaling of Handoff" and assigned to the assignee hereof and hereby expressly incorporated by reference herein.

BACKGROUND

I. Field

The subject technology relates generally to communications systems and methods, and more particularly to systems and methods for performing efficient communications handoff between access terminals and nodes in an access network.

II. Background

Communication systems are widely deployed to provide various communication services such as voice, packet data, and so on. These systems may be time, frequency, and/or code division multiple-access systems capable of supporting communication with multiple users simultaneously by sharing the available system resources. Examples of such multiple-access systems include Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

A communication system may employ a handoff scheme to allow a moving Access Terminal to stay in communication with serving access points or sectors via Forward Link (FL) and Reverse Link (RL) mechanisms. The sector from which data transmissions are received is referred to as the FL serving sector, and the sector to which the AT sends data transmissions is referred to as the RL serving sector. One objective of fast switching or handoff is to not introduce any packet loss at the higher layers while allowing for uninterrupted transmission to the access terminal. A second objective is to minimize the backhaul communication required between the AP's in the active set. In general, there is a trade off between the amount of back haul communication required and the handoff latencies that can be achieved.

In order to continue uninterrupted data transmission, the new serving sector needs to determine the forward looking RLP state for the forward link, where the forward looking RLP state is defined as the data received at the anchor AP and not yet transmitted, and the data that needs to be retransmitted based on Receiver Status messages from the access terminal. This RLP state is transferred to the new serving sector as part of an L2 handoff negotiation. There is a need for techniques to efficiently select reverse-link (RL) and/or forward-link (FL) serving sectors and indicate such choices for efficient RL and/or FL handoffs in a communication system. More particularly, current systems do not effectively utilize information that the AN may have accumulated when performing a handoff nor do current techniques provides methods for effectively communicating such information that may lead to improved communications performance.

SUMMARY

The following presents a simplified summary of various embodiments in order to provide a basic understanding of some aspects of the embodiments. This summary is not an extensive overview. It is not intended to identify key/critical elements or to delineate the scope of the embodiments disclosed herein. Its sole purpose is to present some concepts in a simplified form as a prelude to the more detailed description that is presented later.

Systems and methods are provided for performing efficient communications handoff between access terminals and access points in a wireless network. In an aspect, one or more access terminals (AT's) perform concurrent decoding of assignment messages from multiple sectors in an active set to provide an efficient method for an access network (AN) to signal a handoff. In this manner, the access network (AN) can control the handoff process taking into account information it has such as preferences of the AT, periodic pilot reports, measured pilot signal strength and so forth. This also provides the AN a method for load balancing where at least one node in the AN (e.g. supervisory node or anchor access point—AP) can observe communications load across multiple sectors and factor in load when signaling handoff to the AT. This feature also allows the AN to provide low latency handoffs, where queue buffer states can be communicated over a backhaul channel before the AN starts the handoff process, where the handoff delay is short since the handoff starts with an assignment message.

In an aspect, the AT concurrently decodes assignment messages from more than one sector in an active set of sectors, where the access network can use assignment messages to initiate an AT handoff. The AT can switch the serving sector to the last sector from which the AT received an assignment message. Further, additional logic may be employed to govern serving sector switch such as restricting switches to sectors in a preferred sector list or other criteria. In one embodiment, the AT may indicate a set of "desired" serving sectors based on information known at the AT and allow handoffs to only those sectors. The assignment messages may independently indicate the forward link (FL) and reverse link (RL) serving sector for support of disjoint links where the FL and RL serving sectors may be different. Furthermore, the assignment messages may concurrently switch the FL and RL serving sectors. Furthermore, any indication of desired serving sectors may differ for forward link (FL) and reverse link (RL) for support of disjoint links.

To the accomplishment of the foregoing and related ends, certain illustrative embodiments are described herein in connection with the following description and the annexed drawings. These aspects are indicative of various ways in which the embodiments may be practiced, all of which are intended to be covered.

DETAILED DESCRIPTION

Systems and methods are provided to facilitate efficient communications handoff for access terminals in a wireless network. In an aspect, a method to handoff communications in a wireless network is provided. The method includes decoding assignment messages from one or more sectors in an active set and performing an access terminal handoff based at least in part on the active set. The method includes employing an access network to initiate the handoff and/or switching to a serving sector that the access terminal last received an assignment message from. Other aspects include switching the serving sector if a last sector received by the access terminal is a desired serving sector, employing assignment messages to independently indicate a forward link (FL) serving sector and a reverse link serving sector for support of disjoint links where the FL serving sector and RL serving sector is different, and/or employing the assignment messages to initiate a concurrent handoff for the FL serving sector and the RL serving sector.

As used in this application, the terms "component," "network," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a communications device and the device can be a component. One or more components may reside within a process and/or thread of execution and a component may be localized on one computer and/or distributed between two or more computers. Also, these components can execute from various computer readable media having various data structures stored thereon. The components may communicate over local and/or remote processes such as in accordance with a signal having one or more data packets (e.g., data from one component interacting with another component in a local system, distributed system, and/or across a wired or wireless network such as the Internet).

Figure 1:
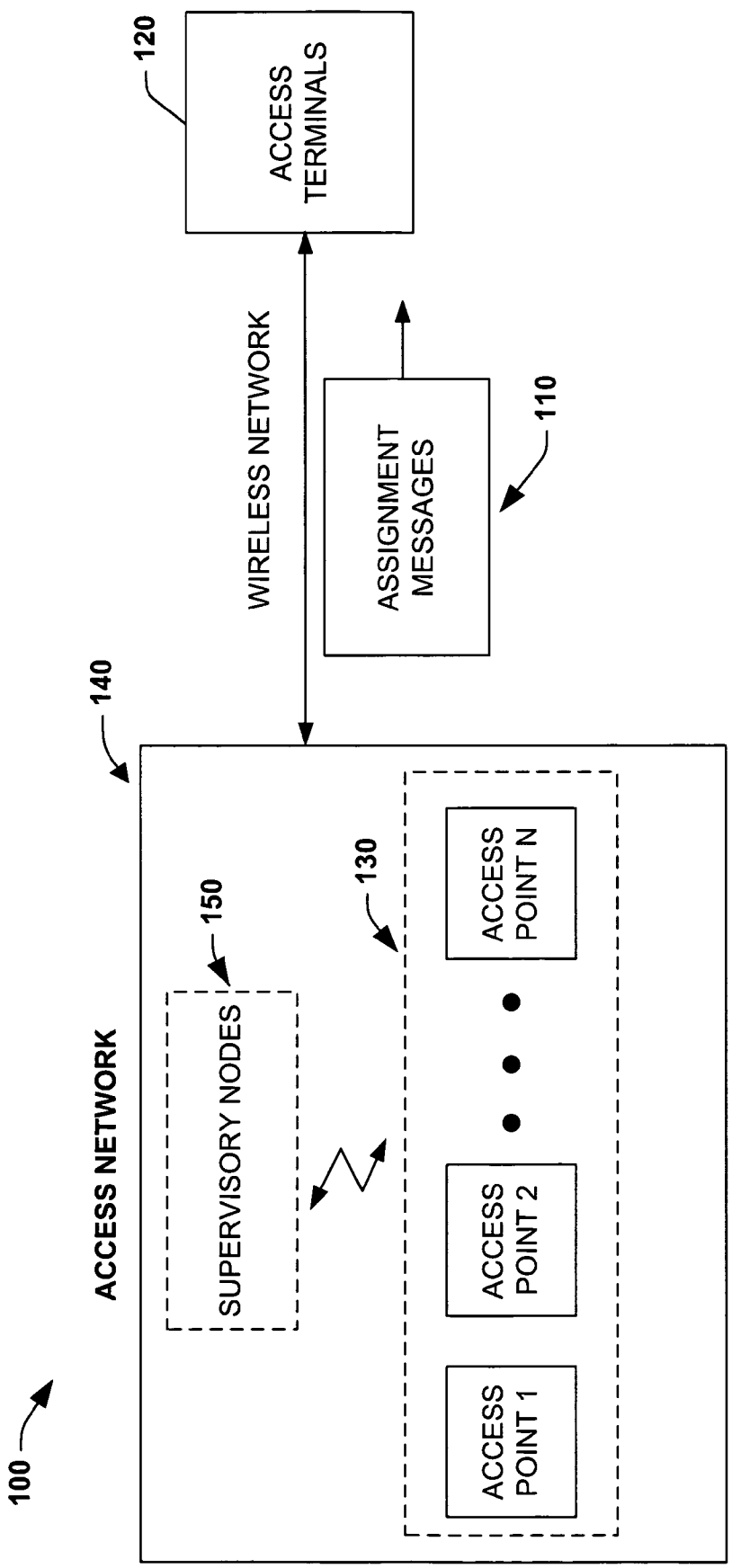
FIG. 1 is a schematic block diagram illustrating components for performing handoff in a wireless system.

FIG. 1 illustrates a network system 100 that employs assignment messages 110 to signal a communications handoff for one or more access terminals (AT) 120. The system 100 includes one or more access points 130 that communicate across a wireless network to one or more access terminals 120. In general, an "access terminal" 120 refers to a device providing voice and/or data connectivity to a user. An access terminal 120 may be connected to a computing device such as a laptop computer or desktop computer, or it may be a self contained device such as a personal digital assistant. The access terminal 120 can also be called a subscriber unit, mobile station, mobile, remote station, remote terminal, user terminal, user agent, or user equipment. The access terminal 120 may be a subscriber station, wireless device, cellular telephone, PCS telephone, a cordless telephone, a Session Initiation Protocol (SIP) phone, a wireless local loop (WLL) station, a personal digital assistant (PDA), a handheld device having wireless connection capability, or other processing device connected to a wireless modem.

The access points 130 can be considered as part of a collective network or access network 140, where the access network can include one or more supervisory nodes 150 and/or one or more of the access points 130 can function as the supervisory node 150 or anchor node. Such supervisory nodes can be employed for such aspects as managing handoff for access terminals and to provide load balancing between access points 130 as is described in more detail below. The "access point" 130 generally refers to a device (e.g., base station) in the access network (AN) 140 that communicates over an air-interface, through one or more sectors, with the access terminals 120. The access point 130 can act as a router between the access terminal 120 and the rest of the access network 140, which may include an IP network, by converting received air-interface frames to IP packets. Access points 130 can also coordinate the management of attributes for the air interface. Handoff is generally the term that is applied when the access terminal needs to switch to some other access point 130 in the access network 140.

During handoff, the access terminal 120 (AT) can have an active set table or buffer comprising the access points 130 (AP) or equivalently base stations that can be the access terminals' serving sectors. For handoff, the AT 120 attempts to decode forward link (FL) and/or reverse link (RL) assignment messages 110 from substantially all sectors in the active set, or possibly a preferred subset of the active set. The AT 120 may indicate the desired FL and/or RL serving sectors using a selected signaling method (e.g., RL control channels, in-band bits, scheduled messages, and so forth). At least one node from the access network (AN) 140 selects the FL and/or RL serving sectors based on available information, such as on the ATs 120 indications of desired FL and RL serving sector, the ATs periodic pilot reports, the measured pilot strength or control channel strength or data channel strength at each AP in the active set, and so forth. The AN 140 then hands-off the FL or RL serving sector by sending the assignment message 110 from the corresponding sector. For example, if the AN 140 selects sector 2 for the ATs 120 RL serving sector, then the sector 2 AP 130 sends an RL assignment to the AT 120.

When the AT 120 receives an assignment message from an AP 130, if the assignment message is a FL assignment message 110, then the AP 130 becomes the AT's FL serving sector. Similarly, if the AT 120 receives a RL assignment message from the AP 130, then the AP becomes the AT's RL serving sector. Some possible variations include that the AT 120 may only respond to assignment messages 110 from desired serving sectors which may be a subset of the active set. Another variation is that the serving sectors may not be disjoint, meaning that the AT 120 FL and RL serving sectors are the same AP 130; in this case if the AT receives either a FL or RL assignment message 110 from an AP 130 and then the AP becomes the AT's serving sector for both FL and RL. The transmission of data on the RL or the transmission of an ACK for data on the FL may be used to acknowledge the handoff. As can be appreciated, assignment messages 110 can be signaled with different AP's 130 providing disjointed operation between the forward and reverse link meaning that one AP supports the forward link and one AP supports the reverse link.

In general, the AT's 120 allow for concurrent decoding of assignment messages from multiple sectors in the active set to provide an efficient method for the access network 140 to signal a handoff. One advantage is that the access network can control the handoff process taking into account information it has such as the load of the respective access points 130, for example. This also allows the AN 140 and more specifically, a supervisory node 150 to perform load balancing in the AN. It also provides the AN 140 a method for low latency handoffs, where queue buffer states can be communicated over a backhaul channel before the AN starts the handoff process, and the handoff delay is thus short since the handoff starts with the assignment message 110. Before proceeding, the following definitions may apply: Active set—The set of sectors to which the AT 120 can perform a fast handoff. Typically the AT 120 has a MAC ID and control channels for each sector in the active set. FL Serving Sector—Last sector from which the AT 120 received an FLAB (Forward Link Assignment Block). RL Serving Sector—Last sector from which the AT received an RLAB (Reverse Link Assignment Block). In an aspect, a component is provided to perform handoff in a wireless network. The component includes means for communicating forward link and reverse link status (AP 130), means for signaling a handoff based in part on the status (assignment message 110), and means for switching to an alternative communications sector based in part on the means for signaling the handoff (access terminal 120).

Figure 2:
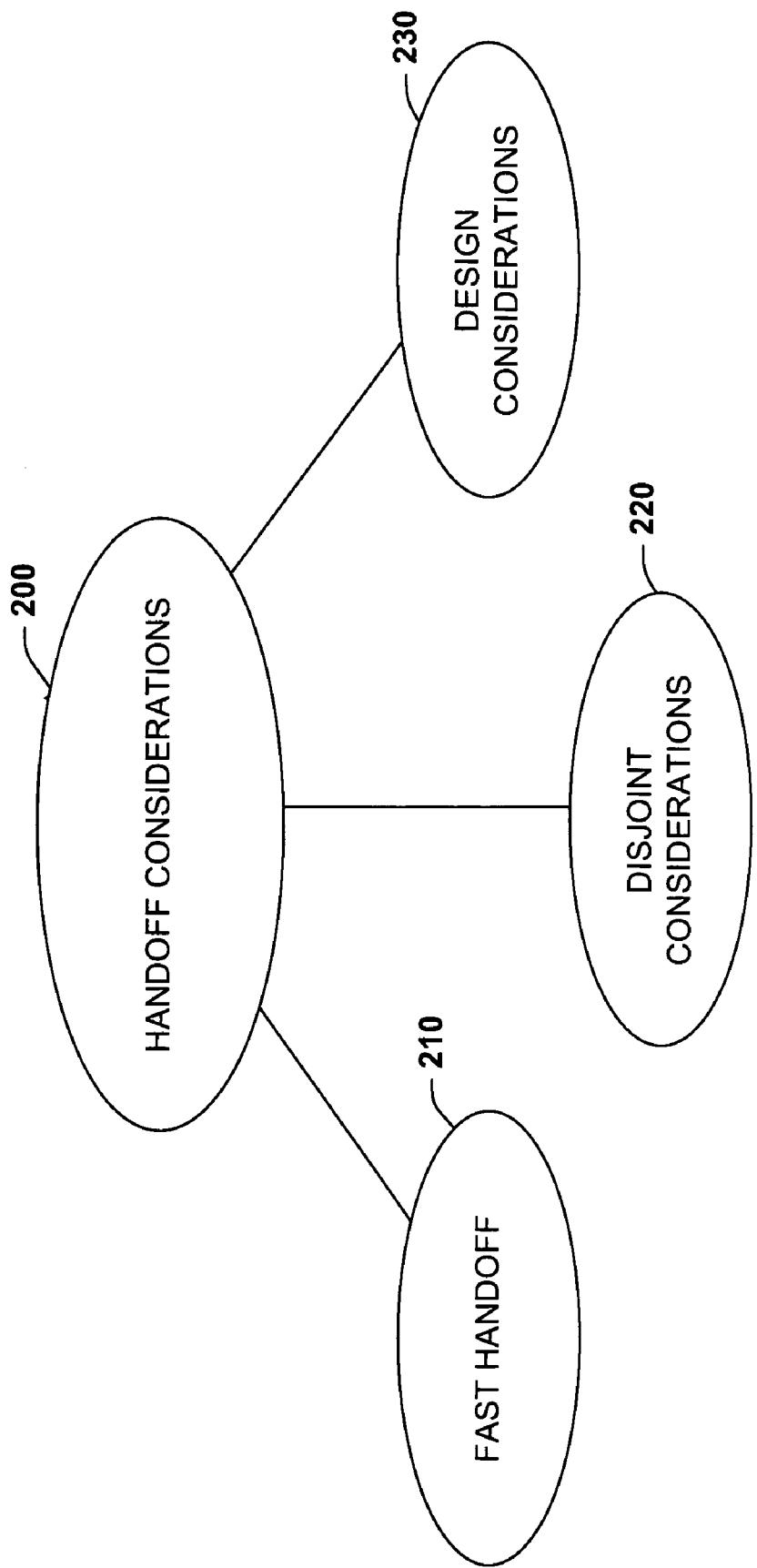
FIG. 2 illustrates example handoff considerations.

FIG. 2 illustrates example handoff considerations 200. At 210, fast handoff criteria are considered. This includes support of latency-sensitive traffic, where channel requirements can change quickly, especially with frequency reuse of one at vehicular speeds. In general, the AT can be assigned a MAC ID and control channel for each AP in the active set. A channel quality indicator (CQI) can be sent to all sectors in the active set which can be used by the AT to indicate desired FL or RL serving sector. Meaning of CQI bits can depend on active set size and RL control channel type (i.e., CDM vs. OFDM). Requests can be sent to the desired RL serving sector and used by AT to indicate desired RL serving sector. It is noted that a CQI redirect operation can be viewed as a handoff request. Thus, the previous FL serving sector can continue to send the user FL data, provides margin for buffer handover delays, and/or allows the AN to provide some load balancing such as in view of the CQI or other parameter such as directing traffic to an AP based on AP server load considerations (e.g., lower utilized AP's in a sector receive more handoff traffic).

At 220, support for Disjoint Links is provided. As noted above, FL and RL can be served from the same AP or disjointed and served from separate AP's. These considerations may include comparing how one communication link may suffer compared to the other without disjoint links. Other aspects include potential different loadings on FL and RL leading to better serving sectors for each link. Note, minor disjoint links are sometimes natural in CDMA with soft handoff. Another aspect at 220 is to support asymmetric network deployments, such as hot spots. At 230, some design considerations are provided. This may include providing one or more components to measure FL and RL quality; to provide separate FL and RL handoff redirect messages in a fast manner; determine initial transmit power after handoff, and/or provide AP's with FL channel quality information for sending data and control bits efficiently. Other considerations 230 may include controlling the amount of interference created by control channel transmissions.

Figure 3:
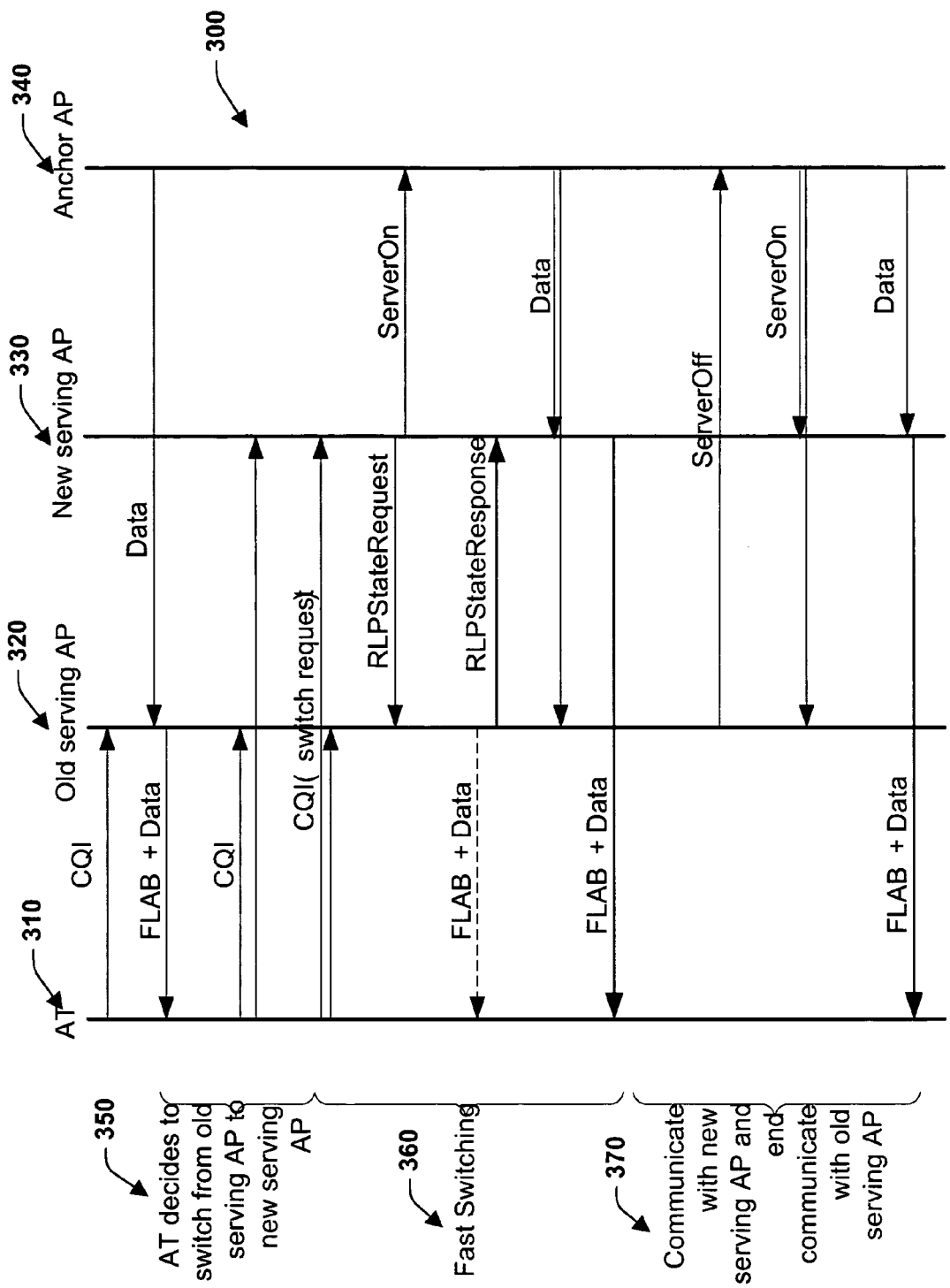
FIG. 3 illustrates an example handoff flow diagram.

FIG. 3 illustrates and example handoff flow diagram 300. From the diagram 300, an AT node is represented at 310, an old serving AP at 320, a new serving AP 330, and an anchor or supervisory AP at 340. As can be appreciated, more than these shown nodes can be provided. At 350, the AT decides to switch from an old serving AP 320 to a new on at 330. This includes data exchanges for CQI, and forward link assignment channels data. At 360, fast switching occurs between new and old APs, assignment channel data is received by the AT and reverse link request/response packets are exchanged. At 370, new serving AP is now commenced and communications are ended with the old serving AP. Here, server off and on handshaking bits are exchanged for example.

Figure 4:
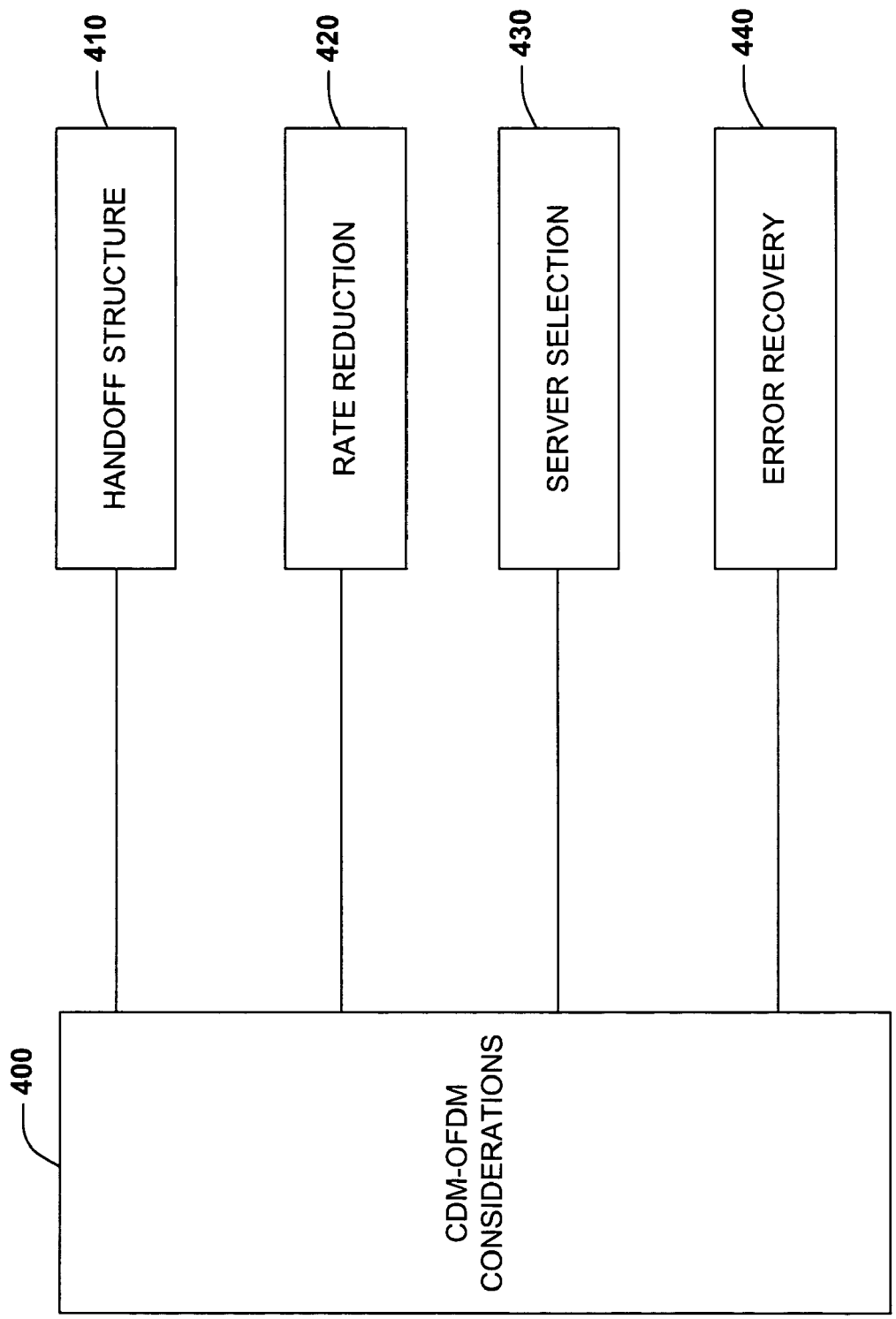
FIG. 4 illustrates example CDM-OFDM considerations.

FIG. 4 illustrates example OFDM and CDMA considerations 400. Proceeding to 410, handoff structure is considered. Here, the AT sends one CQI value, where all AP's in the active set decode CQI. The value sent in the CQI alternates between the different active set FL values and mostly targets sectors from which the last FLAB was received. This communication also does not have to be deterministic. Generally, a CQI value is sent to each sector in the active set at least once in a period of time which can be adjusted.

When the active set size is greater than 1, some mechanism (such as scrambling codes on the CQI channel) is used to indicate the FL sector to which the CQI values correspond and to indicate the desired FL serving sector. A multi-bit CQI value indicates the channel quality. Generally, the FL serving sector switches after a predetermined number of requests. This allows receiver design to tradeoff search complexity for speed.

At reference numeral 420, rate reduction considerations are described. This can include how CQI is used for such aspects as: power control channel inversion, data power control channel inversion, segment selection, rate prediction including multi-user diversity considerations. Generally, a user with an active set size>1 may have a reduced range of CQI values. (i.e., max of 9 dB based on Pilot DROP of −9 dB). Typically, all active set sectors demodulate the CQI. The CQI can be power-controlled to the RL serving sector. If disjoint links, then an ACK sent at margin above CQI Tx-Power.

At reference numeral 430, server selection considerations are described. Generally, select an RL serving sector based on lowest filtered percentage of erasures. Assume meeting target erasure probability for RL serving sector if getting mixture of up/down commands. Generally, select FL serving sector based on: Highest filtered (common and/or ACQ) pilot SINR, i.e., 1-tap IIR filtered pilot SINR exceeds current FL serving sector by predetermined amount; and/or observing sectors with sufficient RL quality which could be based on filtered percentage of CQI erasures. At reference numeral 440, error recovery is considered. This can include a multi-bit CQI where sector scrambling code differentiates handoff CQI from standard CQI. Note for ambiguity in handoff or standard CQI between AT and AP. This can occur for all state changes from handoff to standard mode; following active set add or drop AP extends CQI search space to look for both handoff and standard CQI until switch is detected; during non-handoff situations, if the AP detects XX (e.g., 3) CQI erasures in a row, then it starts searching the wider CQI space for the opposite mode. If it detects the opposite mode CQI, then it can issue a message to correct the state discrepancy.

Figure 5:
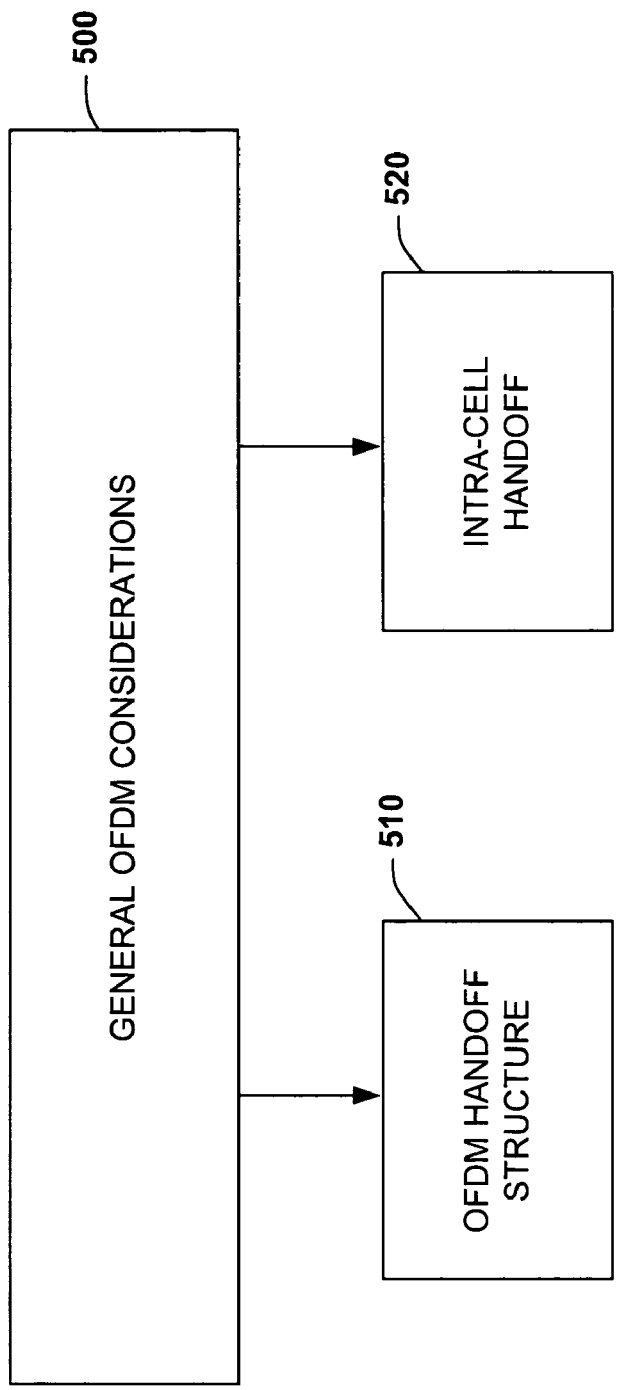
FIG. 5 illustrates general OFDM considerations.

FIG. 5 illustrates general OFDM considerations 500. Proceeding to 510, fast handoff structure is provided for general OFDM systems. In one aspect, CQI and REQ allocation can be provided on different control interlaces for each active set sector if desired, where CQI can be sent to all sectors in the active set. Non-FL serving sector CQI's may be sent at a slower rate to create partial loading gains and CQI can be based on active set size where discrete CQI values can be transmitted (e.g., 3 bit, 4 bit values). For CQI Tx-Power, this includes considering close CQI to RL serving sector. Tx-Power for non-serving sectors based on Boolean condition "Or-of-downs." For FL Serving Sector CQI, close CQI to desired FL serving sector can be provided to within an offset of the RL serving sector Tx-Power, if desired. If CQI is not closed (too small of a percent of power down commands) at the maximum offset, then select next best FL for serving sector. For REQ sent to desired RL serving sector, select RL serving sector based on lowest required CQI transmit power or highest filtered percentage of down commands among "Or-of-downs." Select FL serving sector based on: Highest filtered (common and/or ACQ) pilot SINR, and/or observing sectors with sufficient RL quality.

At reference numeral 520, intra-cell handoff considerations are described. Here, the AT sends CQI values for each FL. This can include alternating in CDM control or concurrent in OFDM control. The AT power controls can be based on "Or-of-downs", and sends REQ on best RL. The AP can compare CQI values to determine the best FL and compare control channel received pilot level to determine the best RL. Also, the AP can provide packet-by-packet fast handoff by sending LACH on the best links corresponding SSCH. In another aspect, the AT assigned traffic channels on a hop-port set can be restricted for one of the sectors in the active set, where the assignment can be made by the non-restricted sector to facilitate orthogonal hopping. Generally, the AP employs MRC to combine the received signals.

Figure 6:
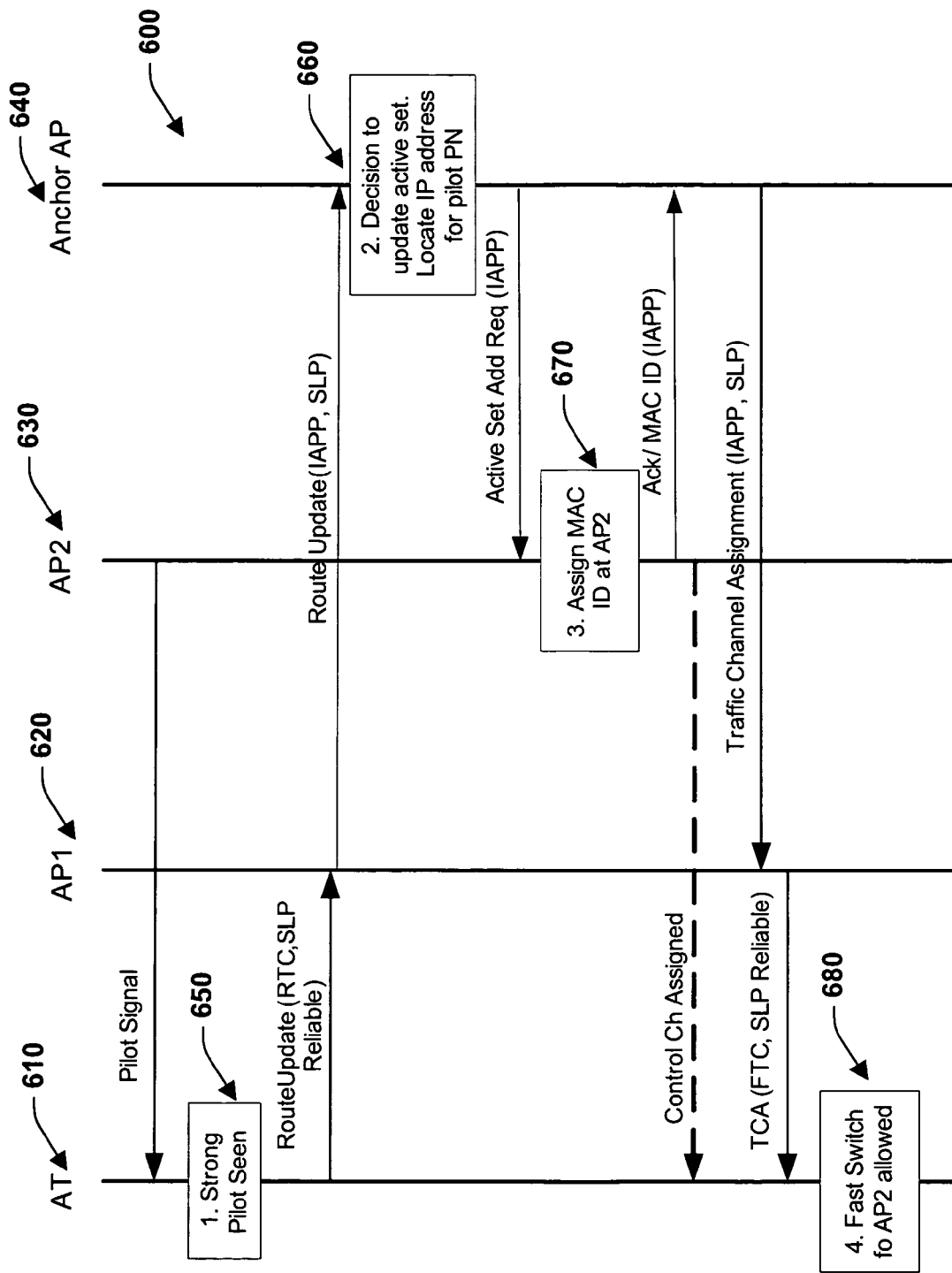
FIG. 6 illustrates example synchronous switching considerations.

FIG. 6 illustrates an example handoff flow diagram 600 for a synchronous switchover. It is noted before proceeding that asynchronous switching is supported in addition to the synchronous example provided herein. From the diagram 600, an AT node is represented at 610, an old serving AP at 620, a new serving AP 630, and an anchor or supervisory AP at 640. As can be appreciated, more than these nodes shown can be provided as previously noted. At 650, a strong pilot signal is observed at the AT 610. From this observation, a signal is transmitted at 660 to update the active set. At 670, a decision is made to update the active set, where a request is generated and a MAC ID is assigned to node AP2 630. After acknowledgements, channel assignments are made where a fast switch to AP2 occurs at 680.

Figure 7:
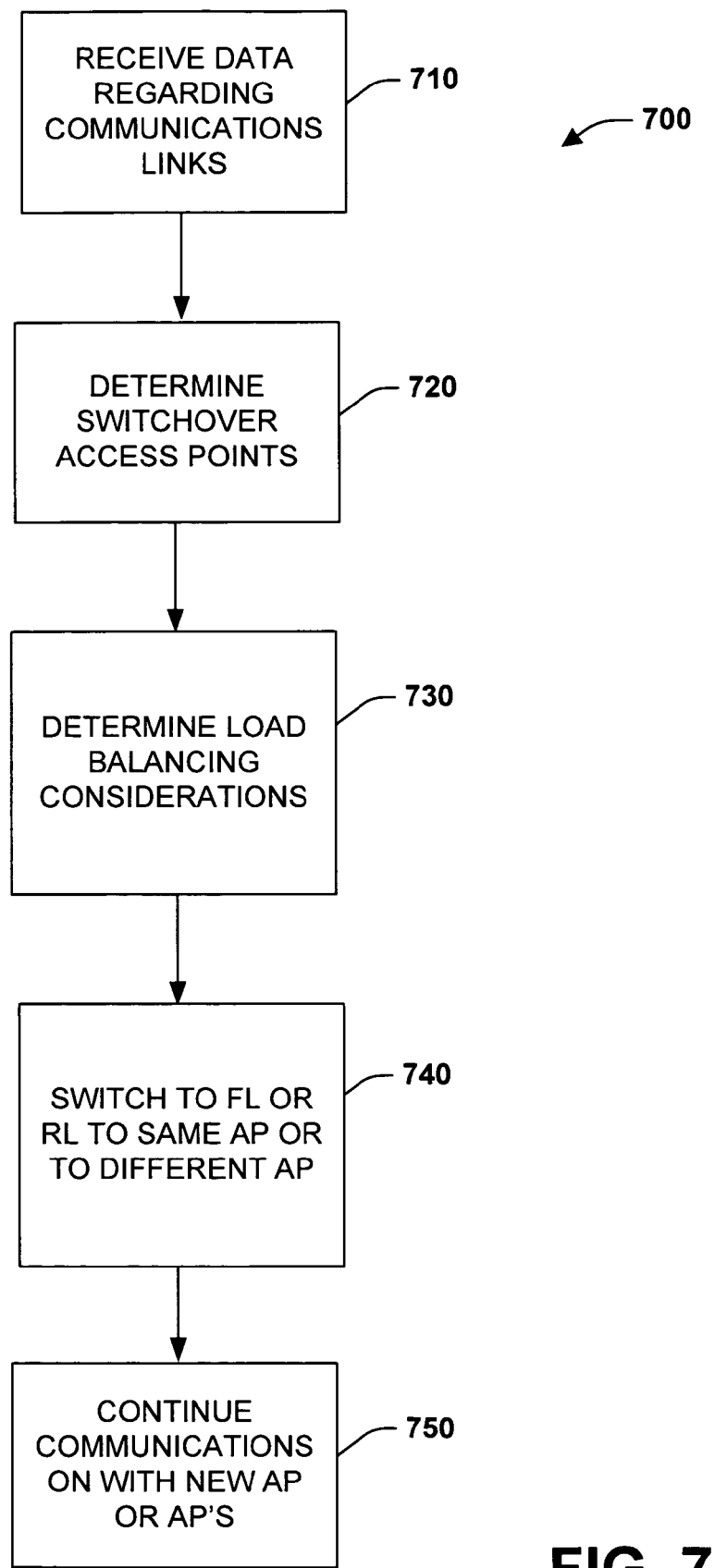
FIG. 7 is a diagram illustrating an example switching process for a wireless system.

FIG. 7 illustrates an example process 700 for switching between access points within an access network. While, for purposes of simplicity of explanation, the methodology is shown and described as a series or number of acts, it is to be understood and appreciated that the processes described herein are not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject methodologies disclosed herein.

Proceeding to 710, an access terminal (AT) receives data regarding a potential switchover between access points. This data can originate from the AP (e.g., anchor AP) or from some other point in an access network (AN) such as from a supervisory node. At 720, one or more access points are determined for the forward link (FL) and the reverse link (RL) serving sectors. As noted above, these links FL and RL can be served from the same access point or be served in a disjoint manner from separate access points after a switchover. At 730, load balancing considerations are determined between access points. Thus, in addition to signal quality considerations, considerations of an access points actual communications load can be determined before switching to a particular node. At 740, based on signal quality, load balancing, or other considerations, a switchover is performed between the AT and to one or more APs. As noted above, indications of such switching can be provided via assignment messages. Thus, the AT can determine which sector is the serving sector for either the forward link or the reverse link be determining which sector sent the last assignment message. At 750, communications are then commenced between the AT and the AP after the respective handoff between communications sectors.

Figure 8:
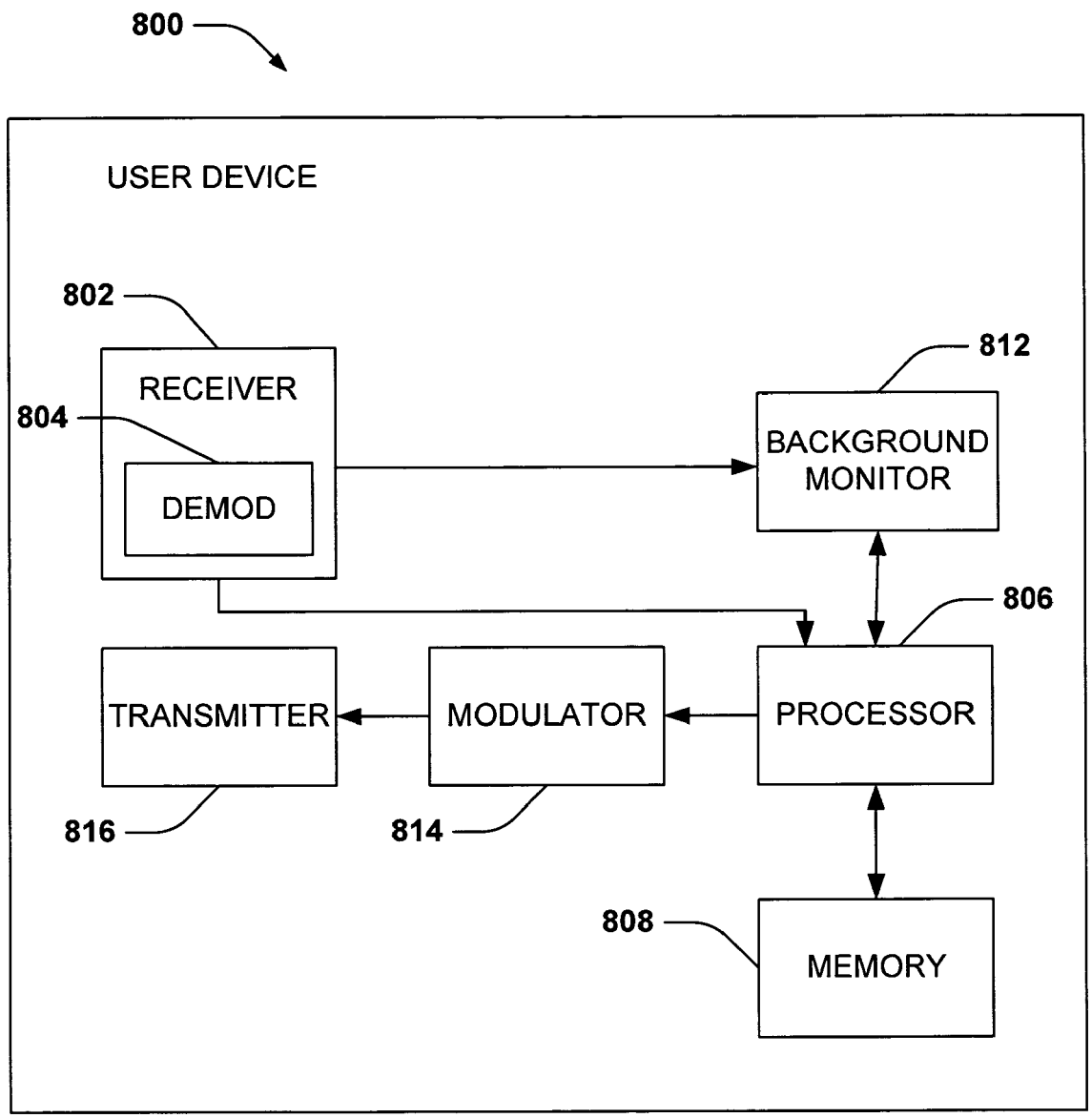
FIG. 8 is a diagram illustrating an example user device for a wireless system.

FIG. 8 is an illustration of a user device 800 that is employed in a wireless communication environment, in accordance with one or more aspects set forth herein. User device 800 comprises a receiver 802 that receives a signal from, for instance, a receive antenna (not shown), and performs typical actions thereon (e.g., filters, amplifies, down converts, etc.) the received signal and digitizes the conditioned signal to obtain samples. Receiver 802 can be a non-linear receiver. A demodulator 804 can demodulate and provide received pilot symbols to a processor 806 for channel estimation. Processor 806 can be a processor dedicated to analyzing information received by receiver 802 and/or generating information for transmission by a transmitter 816, a processor that controls one or more components of user device 800, and/or a processor that both analyzes information received by receiver 802, generates information for transmission by transmitter 816, and controls one or more components of user device 800.

User device 800 can additionally comprise memory 808 that is operatively coupled to processor 806 and that stores information related to wireless network data processing. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory. User device 800 further comprises a background monitor 812 for processing data, a symbol modulator 814 and a transmitter 816 that transmits the modulated signal.

Figure 9:
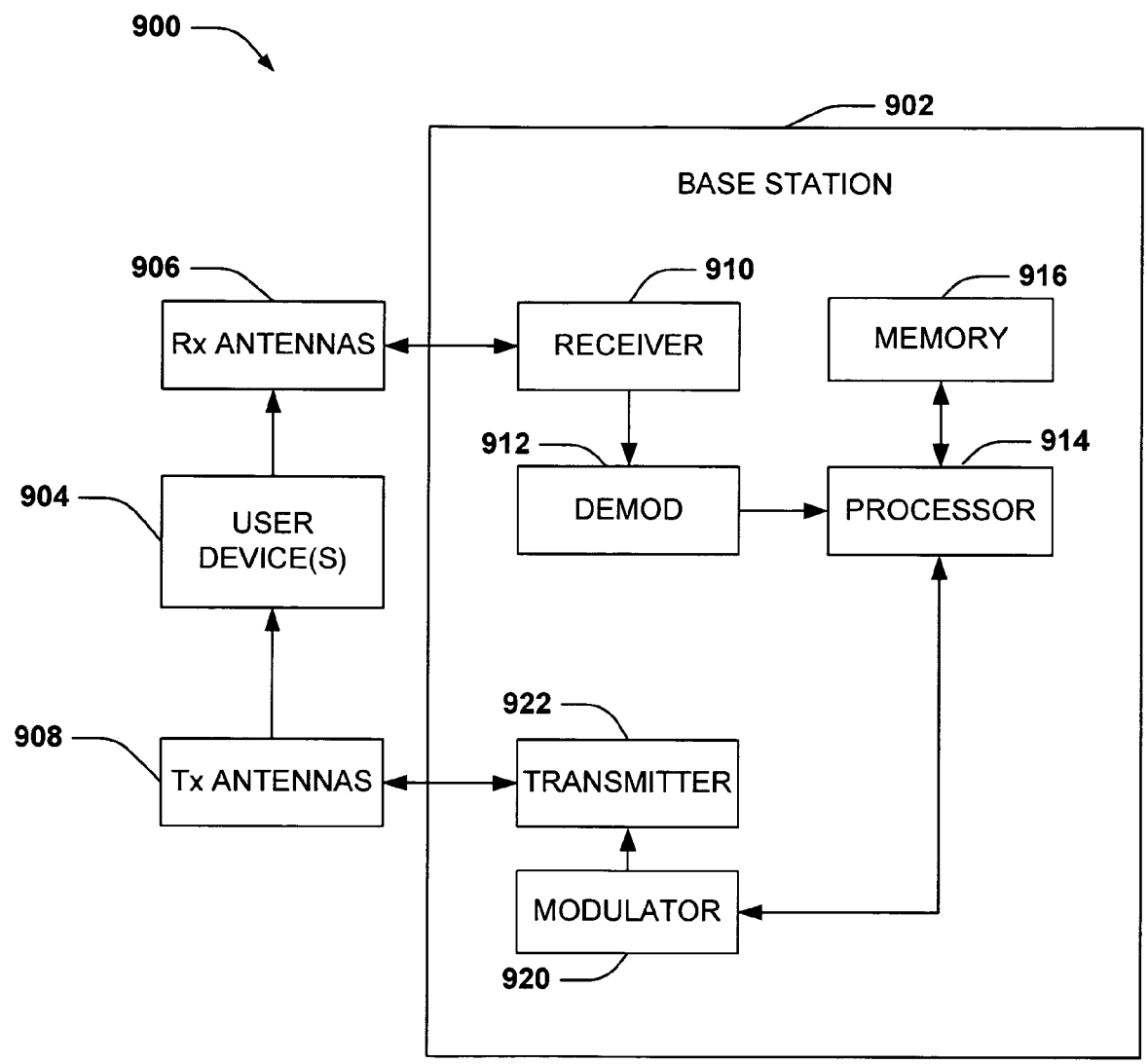
FIG. 9 is a diagram illustrating an example base station for a wireless system.

FIG. 9 is an illustrates an example system 900 that comprises a base station 902 with a receiver 910 that receives signal(s) from one or more user devices 904 through a plurality of receive antennas 906, and a transmitter 922 that transmits to the one or more user devices 904 through a transmit antenna 908. Receiver 910 can receive information from receive antennas 906 and is operatively associated with a demodulator 912 that demodulates received information. Demodulated symbols are analyzed by a processor 914 that is similar to the processor described above, and which is coupled to a memory 916 that stores information related to wireless data processing. A modulator 920 can multiplex a signal for transmission by a transmitter 922 through transmit antenna 908 to user devices 904.

Figure 10:
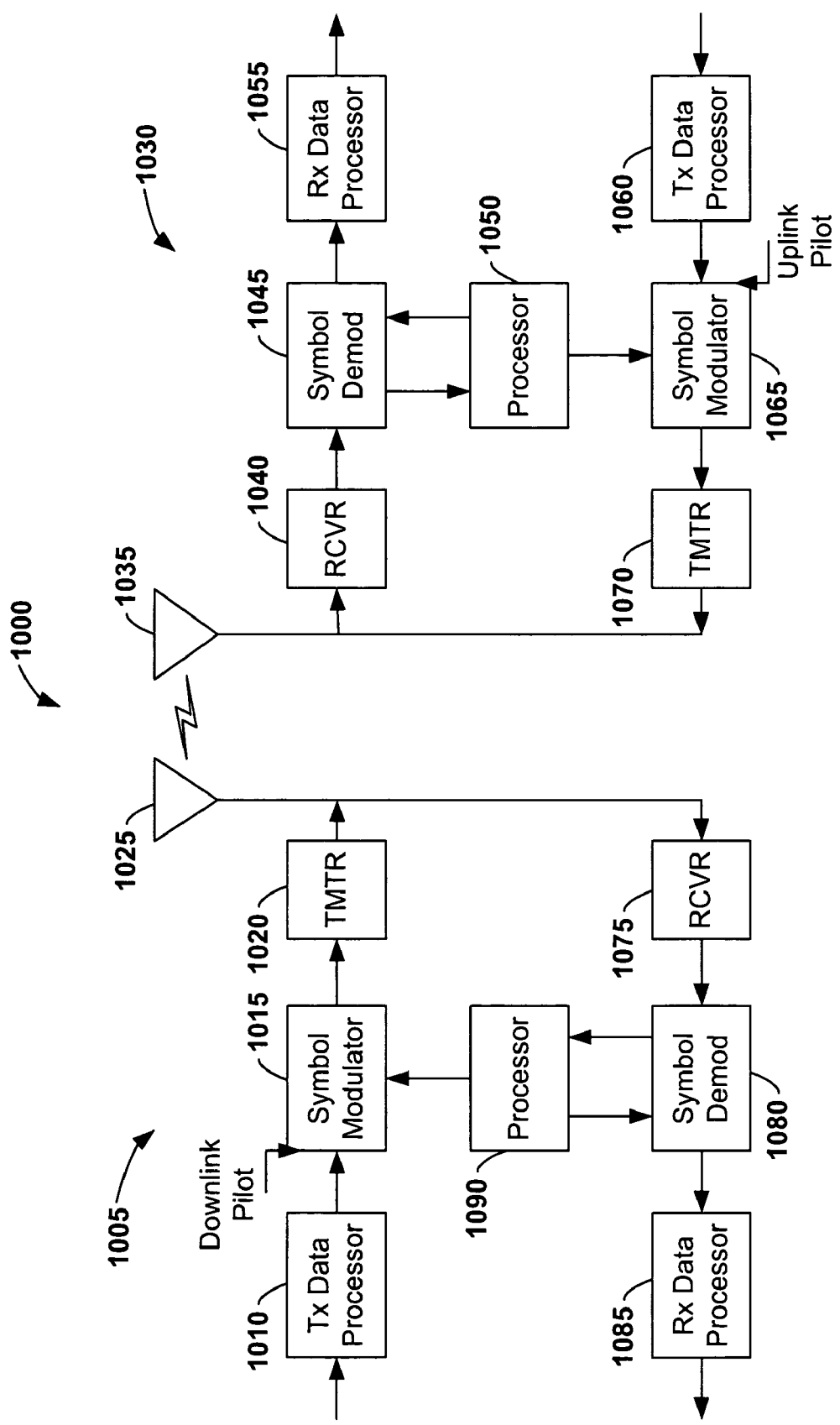
FIG. 10 is a diagram illustrating an example wireless transmitter and receiver system.

FIG. 10 shows an exemplary wireless communication system 1000. The wireless communication system 1000 depicts one base station and one terminal for sake of brevity. However, it is to be appreciated that the system can include more than one base station and/or more than one terminal, wherein additional base stations and/or terminals can be substantially similar or different for the exemplary base station and terminal described below.

Referring now to FIG. 10, on a downlink, at access point 1005, a transmit (TX) data processor 1010 receives, formats, codes, interleaves, and modulates (or symbol maps) traffic data and provides modulation symbols ("data symbols"). A symbol modulator 1015 receives and processes the data symbols and pilot symbols and provides a stream of symbols. A symbol modulator 1015 multiplexes data and pilot symbols and provides them to a transmitter unit (TMTR) 1020. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1020 receives and converts the stream of symbols into one or more analog signals and further conditions (e.g., amplifies, filters, and frequency up converts) the analog signals to generate a downlink signal suitable for transmission over the wireless channel. The downlink signal is then transmitted through an antenna 1025 to the terminals. At terminal 1030, an antenna 1035 receives the downlink signal and provides a received signal to a receiver unit (RCVR) 1040. Receiver unit 1040 conditions (e.g., filters, amplifies, and frequency down converts) the received signal and digitizes the conditioned signal to obtain samples. A symbol demodulator 1045 demodulates and provides received pilot symbols to a processor 1050 for channel estimation. Symbol demodulator 1045 further receives a frequency response estimate for the downlink from processor 1050, performs data demodulation on the received data symbols to obtain data symbol estimates (which are estimates of the transmitted data symbols), and provides the data symbol estimates to an RX data processor 1055, which demodulates (i.e., symbol de-maps), de-interleaves, and decodes the data symbol estimates to recover the transmitted traffic data. The processing by symbol demodulator 1045 and RX data processor 1055 is complementary to the processing by symbol modulator 1015 and TX data processor 1010, respectively, at access point 1005.

The reverse link message may comprise various types of information regarding the communication link and/or the received data stream. The reverse link message is then processed by a TX data processor 1060, which also receives traffic data for a number of data streams from a data source, modulated by a modulator 1065, conditioned by transmitter (TMTR) 1070, and transmitted back to access point 1005.

At access point 1005, the modulated signals from terminal 1030 are received by antennas 1025, conditioned by receivers 1075, demodulated by a demodulator 1080, and processed by a RX data processor 1085 to extract the reserve link message transmitted by the terminal 1030. Processor 1090 then determines which pre-coding matrix to use for determining the beamforming weights then processes the extracted message.

Processors 1090 and 1050 direct (e.g., control, coordinate, manage, etc.) operation at access point 1005 and terminal 1030, respectively. Respective processors 1090 and 1050 can be associated with memory units (not shown) that store program codes and data. Processors 1090 and 1050 can also perform computations to derive frequency and impulse response estimates for the uplink and downlink, respectively.

Systems and devices described herein may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1090 and 1050.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes exemplary embodiments. It is, of course, not possible to describe every conceivable combination of components or methodologies for purposes of describing the embodiments, but one of ordinary skill in the art may recognize that many further combinations and permutations are possible. Accordingly, these embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method to perform handoff in a wireless network, comprising:
    concurrent decoding, by an access terminal, of assignment messages from a plurality of sectors in an active set of the access terminal;
    performing an access terminal handoff signaled to the access terminal by at least one of the assignment messages, wherein the performing further comprises switching to a serving sector from which the access terminal last received an assignment message; and
    employing assignment messages to independently indicate a forward link (FL) serving sector and a reverse link serving sector for support of disjoint links where the FL serving sector and RL serving sector are different.

2. The method of claim 1, further comprising switching the serving sector if the last received assignment message is from a desired serving sector.

3. The method of claim 1, further comprising employing the assignment messages to initiate a concurrent handoff for the FL serving sector and the RL serving sector.

4. The method of claim 1, further comprising receiving the last received assignment message based on a decision of a supervisory node operable to monitor a subset of access points.

5. The method of claim 4, further comprising receiving the last received assignment message based on the supervisory node performing load balancing among the access points.

6. The method of claim 5, wherein the supervisory node comprises at least one access point.

7. The method of claim 1, further comprising generating an active set table or buffer comprising one or more access points that function as serving sectors for the access terminal.

8. The method of claim 7, further comprising decoding forward link (FL) or reverse link (RL) assignment messages from substantially all sectors in an active set.

9. The method of claim 8, further comprising decoding the assignment messages only for a preferred subset of the active set.

10. The method of claim 9, further comprising indicating desired FL or RL serving sectors using at least one signaling process.

11. The method of claim 10, wherein the signaling process further comprises employing at least one of RL control channels, in-band bits, or scheduled messages.

12. The method of claim 10, further comprising selecting FL or RL serving sectors based on available information, based in part on at least one of indications of the FL and RL serving sector from an access terminal, the access terminal's periodic pilot reports, a measured pilot strength, control channel strength, or data channel strength at each access point in an active set.

13. The method of claim 10, further comprising limiting an access terminal to respond to assignment messages from designated serving sectors.

14. The method of claim 10, further comprising requiring an access terminal to respond to a designated subset of the active set.

15. The method of claim 1, wherein performing the access terminal handoff is further based on an access point generating one or more queue buffer states that are communicated over a backhaul channel before an access network begins a handoff process.

16. A component to perform handoff in a wireless network, comprising:
    means for communicating forward link and reverse link status;
    means for receiving, at an access terminal, assignment messages from a plurality of sectors in an active set of the access terminal, wherein the at least one assignment message signals a handoff based in part on the status;
    means for concurrently decoding the received assignment messages;
    means for switching the access terminal to an alternative communications sector based on at least one of the assignment messages, wherein the means for switching further comprises means for switching to a serving sector from which the access terminal last received an assignment message; and
    means for processing assignment messages to independently indicate a forward link (FL) serving sector and a reverse link serving sector for support of disjoint links where the FL serving sector and RL serving sector are different.

17. The component of claim 16, further comprising means for detecting a serving sector that an access terminal last received an assignment message from.

18. The component of claim 17, further comprising means for switching the serving sector if a last assignment message received by the access terminal is from a desired serving sector.

19. The component of claim 16, further comprising employing the assignment messages to initiate a concurrent handoff for the FL serving and RL serving sector.

20. A wireless communications apparatus, comprising:
    a memory that includes a component to process data from one or more access points, wherein the data relates to available serving sectors of an active set of the wireless communications device;
    a receiver configured to receive assignment messages from a plurality of the available serving sectors, wherein at least one of the assignment messages signals a handoff to the wireless communications apparatus; and
    a processor configured to concurrently decode the assignment messages and to initiate the handoff to an alternative serving sector signaled by one or more of the assignment messages, wherein the handoff is to a serving sector from which the wireless communications apparatus last received an assignment message;
    wherein the one or more assignment messages independently indicate a forward link (FL) serving sector and a reverse link serving sector for support of disjoint links where the FL serving sector and RL serving sector are different.

21. The apparatus of claim 20, wherein the serving sector from which the wireless communications apparatus last received the assignment message comprises a desired serving sector.

22. The apparatus of claim 20, wherein, the one or more assignment messages initiate a concurrent handoff for the FL serving sector and the RL serving sector.

23. A method to perform handoff in a wireless network, comprising:
    generating assignment messages from a plurality of sectors in an active set of an access terminal;
    signaling the access terminal, based on concurrent decoding of the received assignment messages by the access terminal, to perform a handoff from at least one access point, wherein the signaling causes the access terminal to handoff to a serving sector from which the access terminal last received an assignment message; and
    employing the assignment messages to independently indicate a forward link (FL) serving sector and a reverse link serving sector for support of disjoint links where the FL serving sector and RL serving sector are different.

24. The method of claim 23, wherein the signaling further comprises signaling from a desired serving sector.

25. The method of claim 23, wherein generating the assignment messages further comprises employing the assignment messages to initiate a concurrent handoff for the FL serving sector and the RL serving sector.

26. A switching apparatus for a wireless network, comprising:
    a table to indicate an active set of serving sectors for an access terminal;
    a component to generate one or more assignment messages from at least one of the serving sectors; and
    at least one access point that employs the assignment messages to signal the access terminal, based on concurrent decoding of the received assignment messages from a plurality of the serving sectors by the access terminal, to perform a handoff to a serving sector from a subset of the serving sectors, wherein the signal causes the access terminal to handoff to the serving sector from which the access terminal last received an assignment message;
    wherein the one or more assignment messages independently indicate a forward link (FL) serving sector and a reverse link serving sector for support of disjoint links where the FL serving sector and RL serving sector are different.

* * * * *